United States Patent
Gopi et al.

(10) Patent No.: US 10,552,454 B2
(45) Date of Patent: Feb. 4, 2020

(54) EFFICIENT PARTITIONING OF RELATED DATABASE TABLES

(71) Applicant: SAP SE, Walldorf (DE)

(72) Inventors: Ajalesh P. Gopi, Bangalore (IN); Veit Bolik, Frankenthal (DE); Santosh Vijayan, Bangalore (IN); Naveen Kolli, Bangalore (IN)

(73) Assignee: SAP SE, Walldorf (DE)

( * ) Notice: Subject to any disclaimer, the term of this patent is extended or adjusted under 35 U.S.C. 154(b) by 734 days.

(21) Appl. No.: 14/981,340

(22) Filed: Dec. 28, 2015

(65) Prior Publication Data
US 2017/0140021 A1    May 18, 2017

(30) Foreign Application Priority Data
Nov. 13, 2015 (IN) .......................... 6119/CHE/2015

(51) Int. Cl.
*G06F 16/27* (2019.01)
(52) U.S. Cl.
CPC .................. *G06F 16/278* (2019.01)
(58) Field of Classification Search
CPC .................. G06F 17/30584; G06F 16/278
See application file for complete search history.

(56) References Cited

U.S. PATENT DOCUMENTS

| | | | | |
|---|---|---|---|---|
| 5,687,369 A * | 11/1997 | Li | ............... | G06F 17/30575 |
| 2001/0011268 A1 * | 8/2001 | Tsuchida | ............... | G06F 9/5083 |
| 2006/0190243 A1 * | 8/2006 | Barkai | ............... | G06F 17/30486 704/8 |
| 2011/0125745 A1 * | 5/2011 | Bright | ............... | G06F 17/30306 707/737 |
| 2013/0166606 A1 * | 6/2013 | Fricke | ............... | G06F 17/30584 707/803 |
| 2013/0311441 A1 * | 11/2013 | Erdogan | ............... | G06F 17/30578 707/713 |

OTHER PUBLICATIONS

SAP Data Aging, Partitioning Objects and Groups, SAP Supply Chain Management 7.0 EHP3, http://help.sap.com, 15 pages, 2014.

\* cited by examiner

*Primary Examiner* — Alford W Kindred
*Assistant Examiner* — Lin Lin M Htay
(74) *Attorney, Agent, or Firm* — Klarquist Sparkman, LLP (57) ABSTRACT

Examples of partitioning a group of related database tables are provided herein. A database table in a group of related database tables can be designated as a lead database table. A partitioning field can also be determined by which database tables in the group are partitioned. A data load, with respect to the partitioning field, of the lead database table can be calculated. The data load can include a data distribution across different values of the partitioning field. A group partitioning scheme can be determined based on the data load of the lead database table. The database tables of the group can then be partitioned according to the group partitioning scheme.

19 Claims, 9 Drawing Sheets

SOFTWARE 980 IMPLEMENTING DESCRIBED TECHNOLOGIES

EFFICIENT PARTITIONING OF RELATED DATABASE TABLES

CROSS-REFERENCE TO RELATED APPLICATIONS

This application claims the benefit of India Provisional Application No. 6119/CHE/2015, filed on Nov. 13, 2015 and titled "EFFICIENT PARTITIONING OF RELATED DATABASE TABLES," which is incorporated herein by reference in its entirety.

BACKGROUND

As computer hardware and software have become increasingly advanced, the amount of data collected about a variety of things has grown substantially. Large amounts of data are often stored in databases having one or more database tables. As database tables grow larger to accommodate new data, the database tables can be partitioned into multiple smaller tables to increase the speed of searching and retrieving information. Partitioning, however, can become extremely complicated and tedious for multiple, related database tables.

DETAILED DESCRIPTION

The examples described herein generally allow partitioning of a group of related database tables. Database tables can be partitioned by a database administrator to provide flexibility in managing the databases and allow faster and more efficient access to stored data. In some instances, data is stored in not just one database table but in multiple, related database tables. Partitioning related database tables can be difficult and tedious for a database administrator.

The described examples are an improvement to database technology that allows a group of related database tables (e.g., that are part of a data document or other structure) to be analyzed and partitioned in a consistent manner such that related information is kept together in the partitions across database tables. As used herein, "partitioning" a database table refers to dividing a single database table into at least two smaller, separate database tables that, together, act as a single database table. The smaller physical size of the post-partitioning database tables allows for faster and more computationally efficient searching and access, which improves the speed of a computer responding to database queries and also improves the computational speed of other operations being performed by the computer because some of the computational resources previously allocated to database queries are no longer needed.

As an example, consider a group of related database tables in which some of the database tables include a "date" field. Although different tables contain the "date" field, the tables can each contain a different number of data items (i.e., be of a different size), and the distribution of data by date can also vary. Simply partitioning each database table in half, in fourths, etc., might create inconsistent partitions. For example, if a first table contains a large amount of data from January and not much for the subsequent months, and a second table contains minimal data from January but a large amount for the subsequent months, partitioning the first and second tables evenly in half leads to a situation in which "January" data could be in either the first or second partition, depending on the database table. Such an arrangement slows down access and query times and consumes unnecessary computing resources. Using the described technologies, the data load of the first and second tables can be analyzed with respect to a partitioning field (e.g., the "date" field) to determine proposed partitions for each table such that the "January" data for both tables is in the respective table's first partition, allowing faster query times and consuming fewer computing resources. Detailed examples of the described technologies are described below with reference to FIGS. 1-9.

Figure 1:
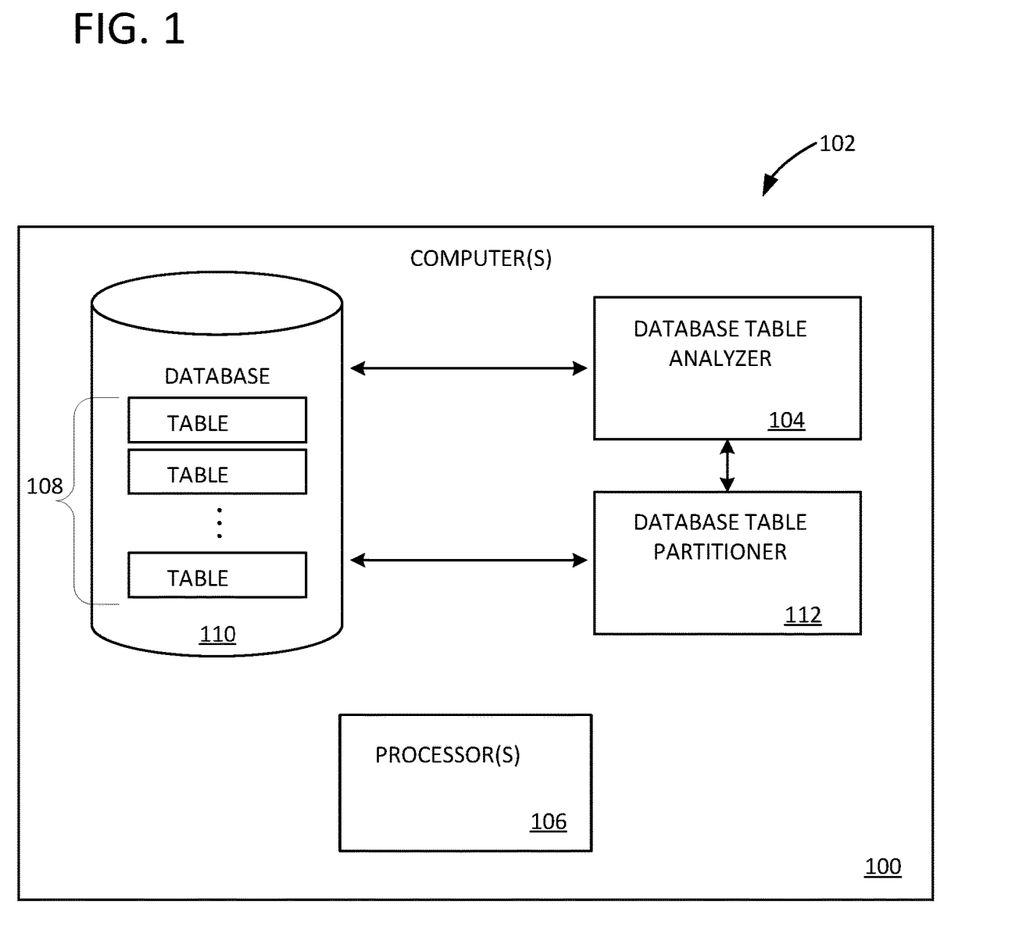
FIG. 1 illustrates an example system configured to partition a group of related database tables.

FIG. 1 illustrates one or more computer(s) 100 implementing a system 102. System 102 includes a database table analyzer 104 that is configured to, by one or more processors 106, determine, as a partitioning field, a field present in at least one database table of a group 108 of related database tables. The partitioning field can be, for example, a date, time, serial number, item number, model number, or other field. The partitioning field can be selected by a user, predetermined, or can be determined as a result of being identified as a date or other numeric field. The group of related database tables is part of database 110, which can be local to computer(s) 100 as shown in FIG. 1 or stored remotely on one or more computers in communication with computer(s) 100 over a network. Database 110 can be, for example, an in-memory columnar relational database.

Database table analyzer 104 is also configured to evaluate a data load, with respect to the partitioning field, of one or more of the respective database tables of group 108. The data load can be measured, for example, as a number of data records or entries or as a volume of data. Data load can also include data distribution (e.g., a number of entries or storage volume for various partitioning field values or ranges of partitioning field values). In some examples, database table analyzer 104 is configured to evaluate the data load of a database table designated as the "lead" database table. The lead table can be the table of group 108 containing the largest amount of data or the most entries (and in which the partitioning field is present) or can be, for example, a user-selected or predetermined "most important" or "primary" table that contains information determined to be important or frequently accessed in group 108. Database table analyzer 104 can be configured to evaluate the data distribution across various values of the partitioning field for the lead table.

Database table analyzer 104 can also be configured to evaluate the data load of multiple (or all) tables that contain the partitioning field. The data load of multiple tables can be used to inform how partitioning is performed by, for example, balancing the partitioning to account for uneven data distributions in some tables.

A database table partitioner 112 is configured to, by the one or more processors 106 and based on the evaluation of the data load by database table analyzer 104, determine a group partitioning scheme. Database table partitioner 112 is further configured to partition the respective database tables of group 108 according to the group partitioning scheme. The group partitioning scheme specifies a proposed partitioning for the various database tables in group 108. The group partitioning scheme can specify, for example, one or more partitioning field values (or value ranges) by which to partition database tables having the partitioning field. For example, if the partitioning field is "year," then partitioning field values can reflect specific years, such as 2010, 2011, etc. Continuing the example, a group partitioning scheme can specify 2008, 2010, and 2011 as partitioning field values at which the database tables should be partitioned. The partitioning field values can be a result of the evaluation of the data load of the lead table (or multiple tables) by database table analyzer 104.

In some examples, one or more of the related database tables in group 108 do not contain the partitioning field. As a specific example, some database tables in group 108 can be related to time-based occurrences where a time is included for each data entry, but other database tables in group 108 may specify other, non-time-based related information. Database table analyzer 104 or database table partitioner 112 can be configured to search tables for the partitioning field.

For tables that do not contain the partitioning field, the group partitioning scheme can specify an alternate way of partitioning. For example, the group partitioning scheme can specify a partitioning ratio with respect to the tables that do contain the partitioning field. The partitioning ratio can be, for example, 1:1, indicating that one partition is created in the table that does not contain the partitioning field for each partition contained in the tables that do contain the partitioning field. Other ratios, such as 2:1, 1:2, etc. are also possible. In some examples, the partitions for the tables that do not contain the partitioning field are of equal size. That is, if there are five partitions, each partition is a same size. In some examples, the size of the partitions corresponds to the size of the partitions in a table that contains the partitioning field (e.g., the lead table). For example, if the lead table is partitioned (or proposed to be partitioned) into database tables of size 100, 50, and 200 (a unit ratio of 2-to-1-to-4), then the same unit ratio can be used for the tables that do not contain the partitioning field.

Database table partitioner 112 can also be configured to determine the group partitioning scheme based at least in part on one or more partition size thresholds. Partition size thresholds can be minimums or not-to-exceed "maximum" constraints (e.g., one million entries, 500 million entries, one billion entries, etc.). Database table partitioner 112 can be configured to subdivide proposed partitions if they exceed the maximum or combine proposed partitions if they are below a minimum. Minimum and maximum thresholds can be set by users or database administrators and can be based on empirical testing or known performance issues depending on the database type.

In FIG. 1, the arrows indicating inputs and outputs of system 102 are only an example. Any of the components of system 102 can be in communication with any other components. In examples in which system 102 is implemented on multiple computer(s) 100 (e.g. multiple server computers), computers 100 can be in communication via a network (not shown).

Figure 2:
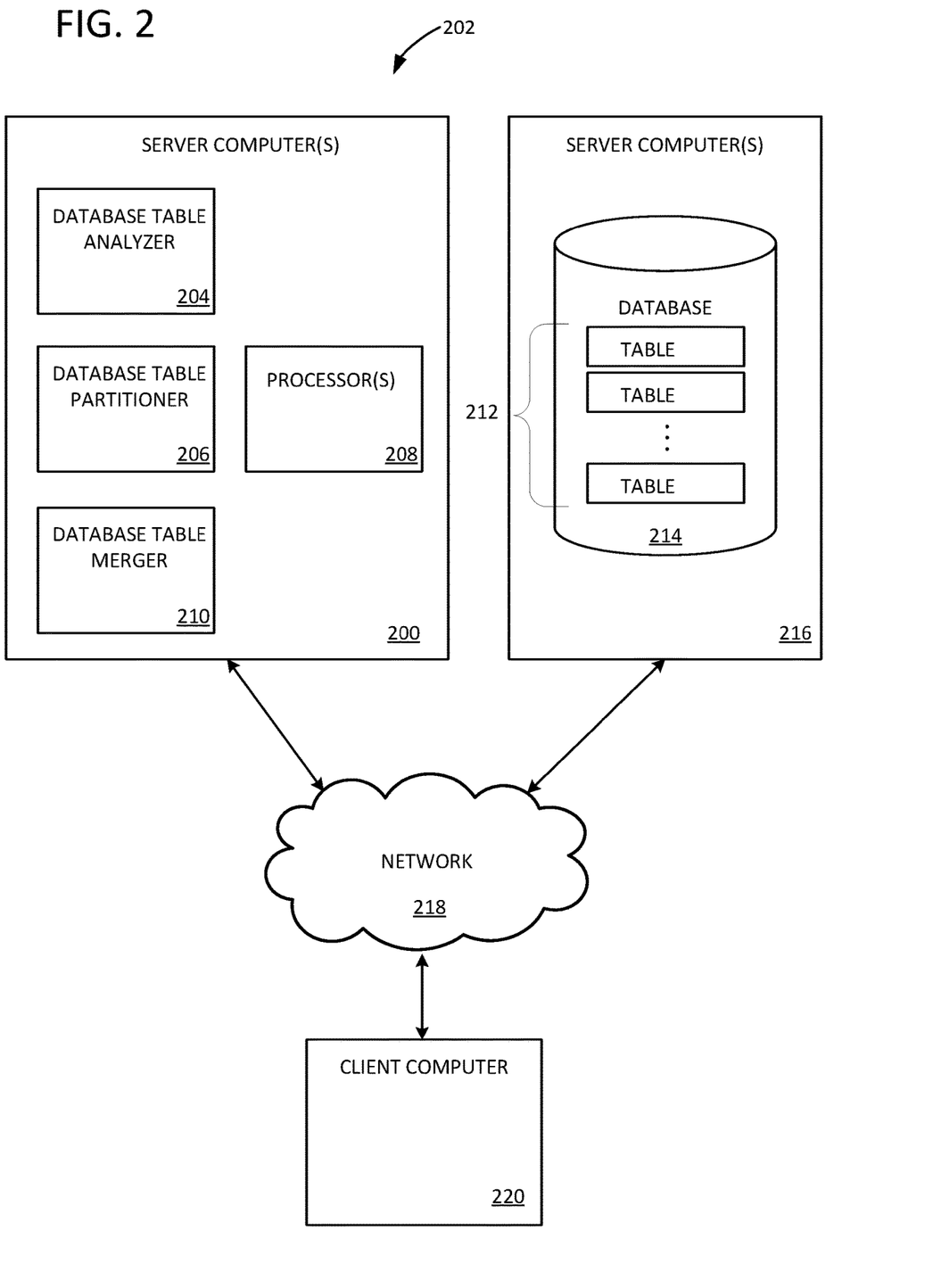
FIG. 2 illustrates an example system configured to partition a group of related database tables in which the system is implemented on one or more server computers accessible from a client computer via a network.

FIG. 2 illustrates one or more server computer(s) 200 implementing a system 202. System 200 comprises database table analyzer 204, database table partitioner 206, and processor(s) 208, which can be similar to the corresponding system components in FIG. 1. System 200 also includes a database table merger 210 configured to, by the one or more processors 208 and for the respective database tables, merge one or more pre-existing partitions prior to partitioning by database table partitioner 206. For example, prior to database table analyzer 204 and database table partitioner 206 evaluating the data load of group 212 of related database tables and determining a group partitioning scheme, any existing partitions are merged so that system 200 evaluates the complete set of data in each database table. In some examples, merging can exceed a size threshold, and in such cases the merging can be omitted.

Database table merger 210 can also be configured to merge partitions after database table partitioner 206 has partitioned the tables in group 212. For example, database table merger 210 can be further configured to, after the partitioning and upon determining that a partition of a database table of group 212 has a growth rate below a threshold, merge the partition, as well as corresponding partitions in the other database tables of group 212, with another partition. Similarly, database partitioner 206 can be configured to, after the partitioning and upon determining that a partition of a database table of group 212 is approaching a partition size threshold, repartition the partition, as well as corresponding partitions in the other database tables of group 212, into two or more additional partitions. In this way system 200 can merge slow-growing partitions and split fast-growing or overly large partitions to keep partitions appropriately sized to realize searching and access time benefits while staying within size constraints. Merging and repartitioning can be performed manually, periodically and/or database table partitioner 206 and database table merger 210 can monitor the data load of partitioned database tables and perform merging and repartitioning as various size thresholds or growth thresholds are reached.

In FIG. 2, a database 214 containing group 212 is stored on a remote server computer(s) 216. Remote server computer(s) 216 can be accessible to server computer(s) 200 via a network 218. Network 218 can be the Internet, a LAN, a wireless local area network (WLAN), a wide area network (WAN), or other type of network, wired or wireless. Client computer 220 is also in communication with network 218. Database table analyzer 204, database table partitioner 206, and/or database table merger 210 can be in the application server layer and be accessible as a partitioning tool via one or more applications executing on client computer 220. Client computer 220 can also access a web application through network 218 that incorporates the functionality of system 200.

Figure 3:
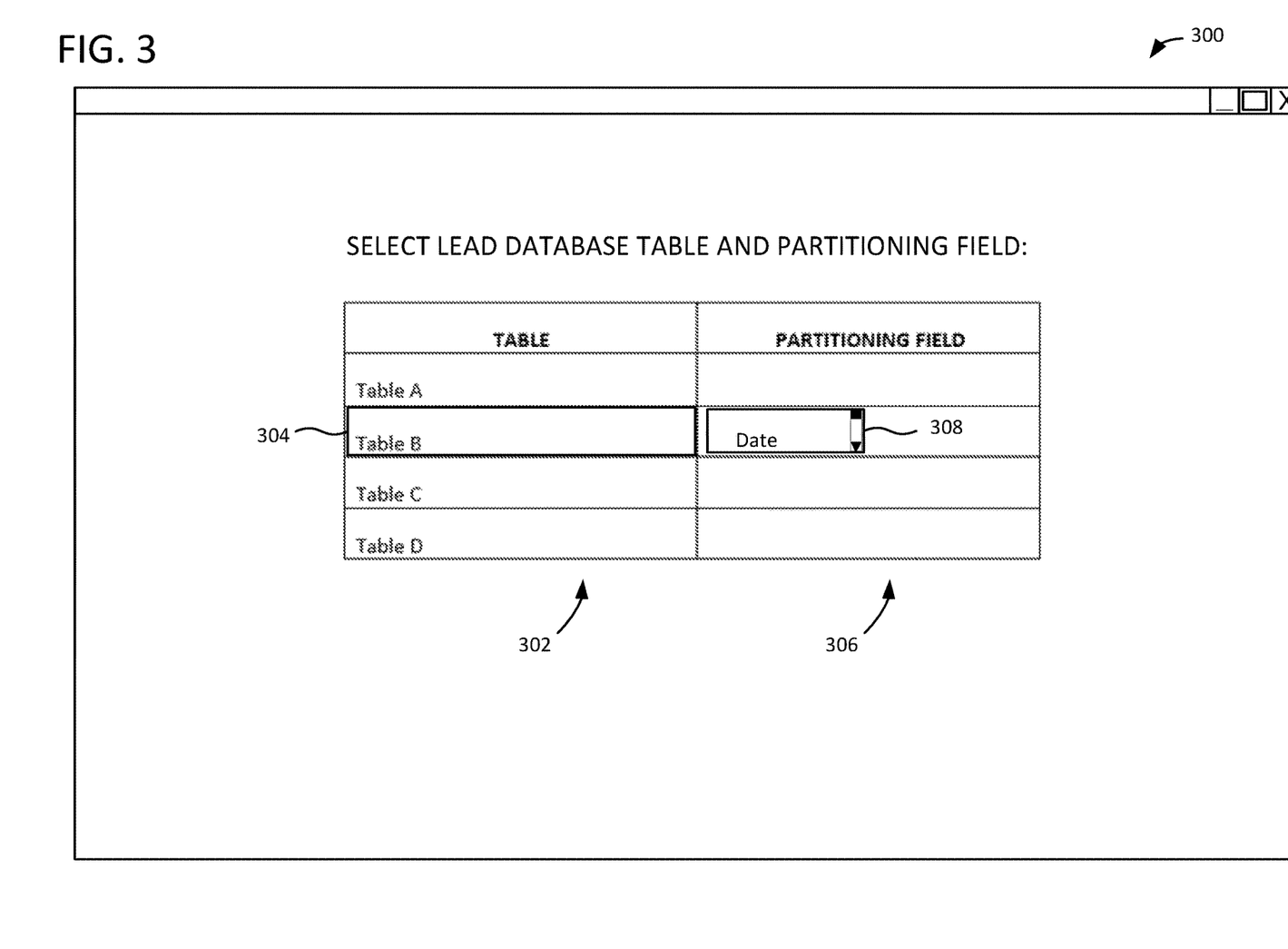
FIG. 3 illustrates an example user interface of a database partitioning tool in which a lead database and partitioning field can be selected.

FIGS. 3-6 illustrate various user interfaces used by applications to access the functionality of systems 100 and 200 of FIGS. 1 and 2. In FIG. 3, user interface 300 illustrates a lead database table and partitioning field selection interface. For a given group of related databases, table list 302 lists each table. Table B is selected in table list 302 as indicated by outlined box 304. Partitioning field list 306 shows the currently selected partitioning field. In some examples, additional partitioning field choices can be selected by interacting with listed partitioning field. In some examples, a drop-down list 308 of available partitioning fields is populated when a lead table is selected. In other examples, a drop-down menu of available partitioning fields is presented with each table. The available partitioning fields can be restricted to alphanumeric fields or other types of fields. In some examples, for different document types (the document being the group of related database tables), partitioning fields and/or lead tables are predetermined and selected by default, but an interface is provided for a user to change the predetermined selections.

Figure 4:
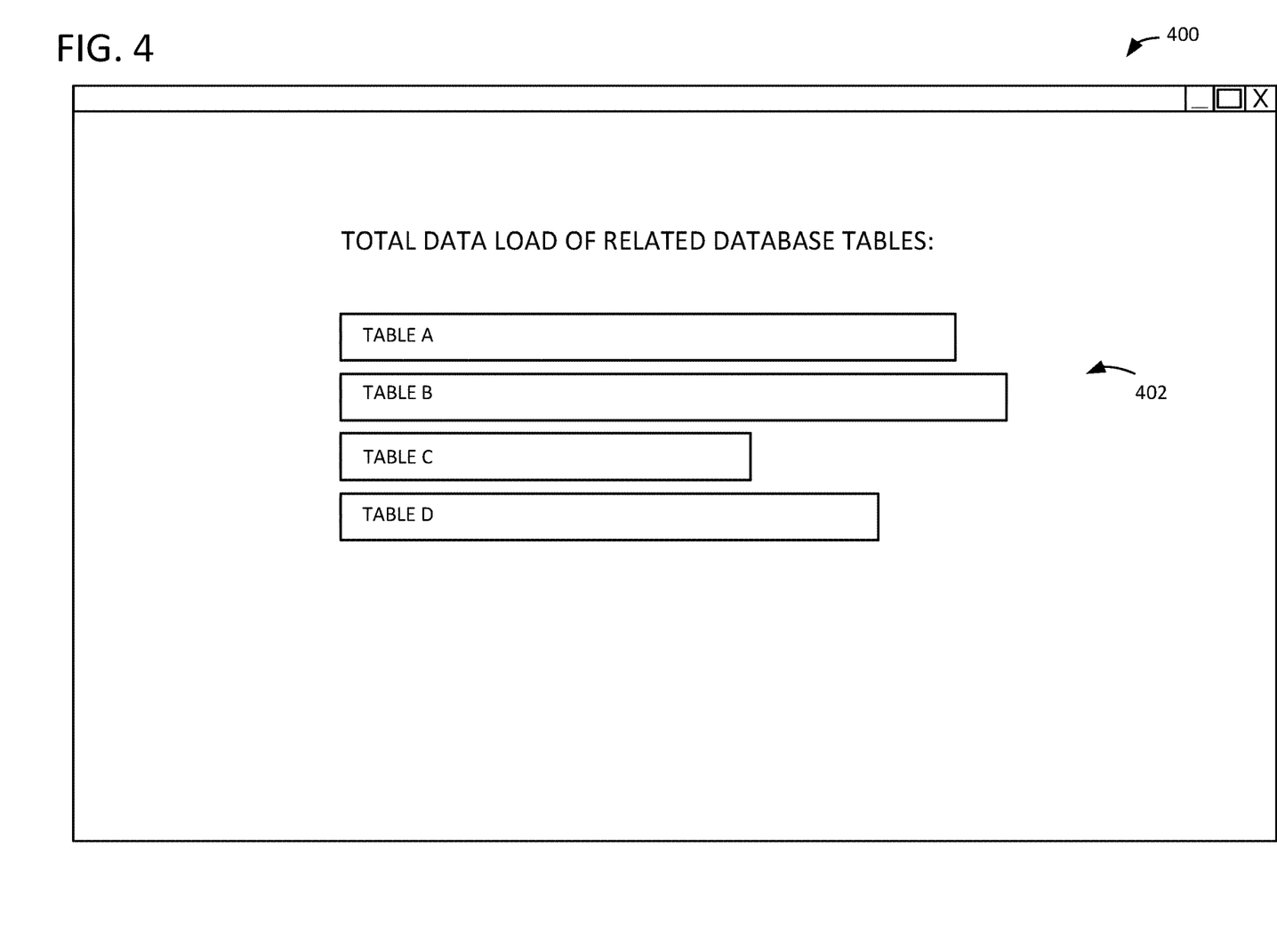
FIG. 4 illustrates an example user interface of a database partitioning tool in which the data load of individual databases is displayed.

FIG. 4 shows user interface 400 that presents a total data load of a group of related database tables. A group of bar graphs 402 illustrate the total number/amount of data in each of Tables A, B, C, and D. User interface 400 can be presented to help users understand the relative sizes of the different related tables prior to accepting a proposed group partition scheme.

Figure 5:
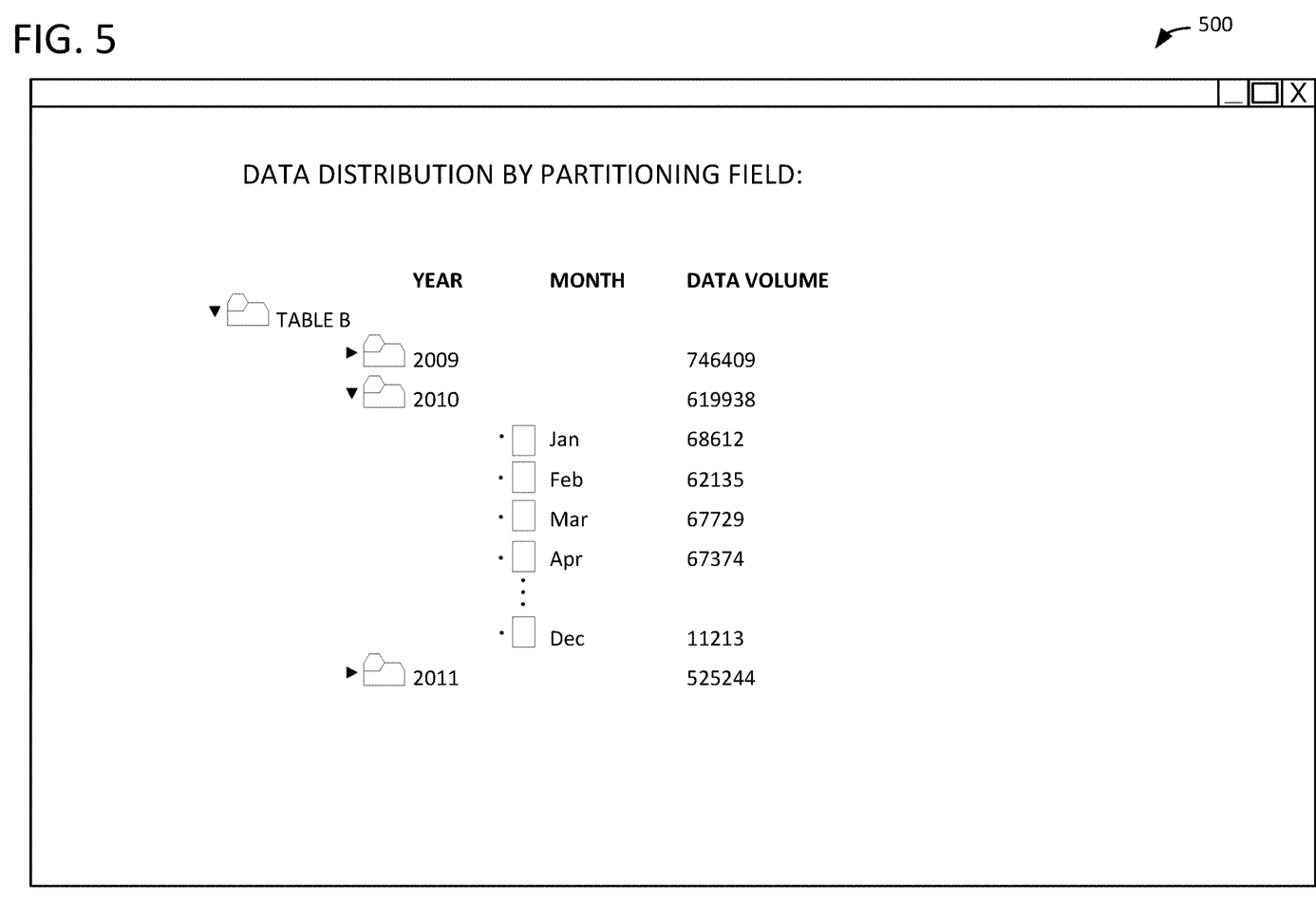
FIG. 5 illustrates an example user interface of a database partitioning tool in which the data distribution with respect to the partitioning field is displayed.

FIG. 5 shows a user interface 500 illustrating data distribution by partitioning field (date) for Table B. Interface 500 is in a tree form, showing data volume for both entire years and individual months.

Figure 6:
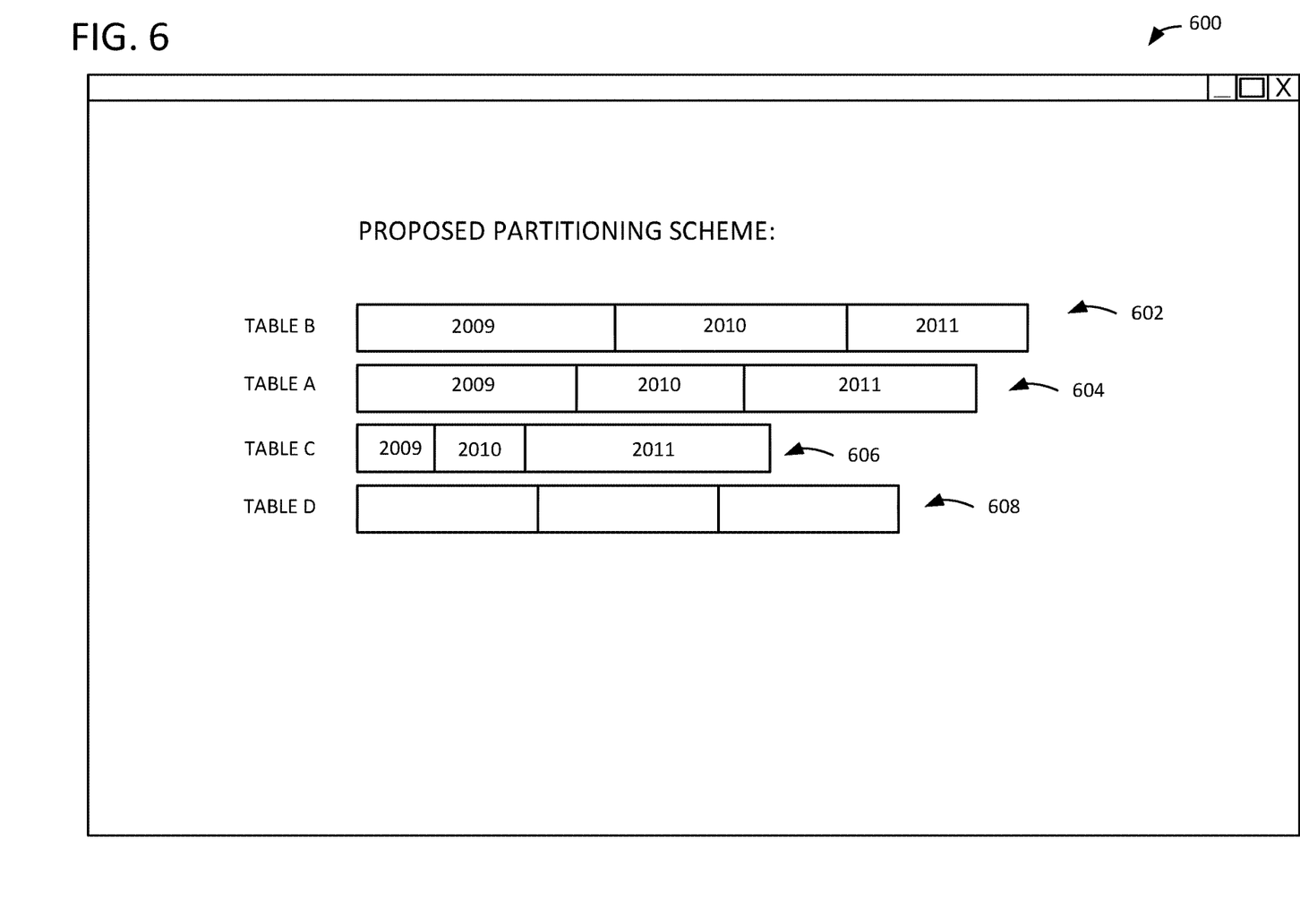
FIG. 6 illustrates an example user interface of a database partitioning tool in which a proposed partitioning scheme is displayed.

FIG. 6 shows a user interface 600 illustrating a proposed database partitioning scheme. The proposed partitioning scheme can be determined as discussed with respect to FIGS. 1 and 2, for example. User interface 600 helps a user understand the partitioning scheme and can be interactive (e.g., partition boundaries can be dragged to change the proposed partitioning). Table B, as the lead table, is shown in bar graphic 602. The partitioning field is "date," and the tables having the date field (tables A, B, and C) are partitioned according to year, resulting in three, differently sized partitions for each of Tables A, B, and C. Table A is shown by bar graphic 604, and table C is shown by bar graphic 606. Database table D, shown as bar graphic 608, does not contain the partitioning field, and it is partitioned into the same number of partitions of equal size as tables A, B, and C (three). In some examples, the three partitions of table D are sized proportionally to the partitions of Table B, with the first being the largest, etc. as shown in bar graphic 602. In some examples, the user interfaces shown in FIGS. 3-6 are omitted and the group partitioning is performed automatically.

Figure 7:
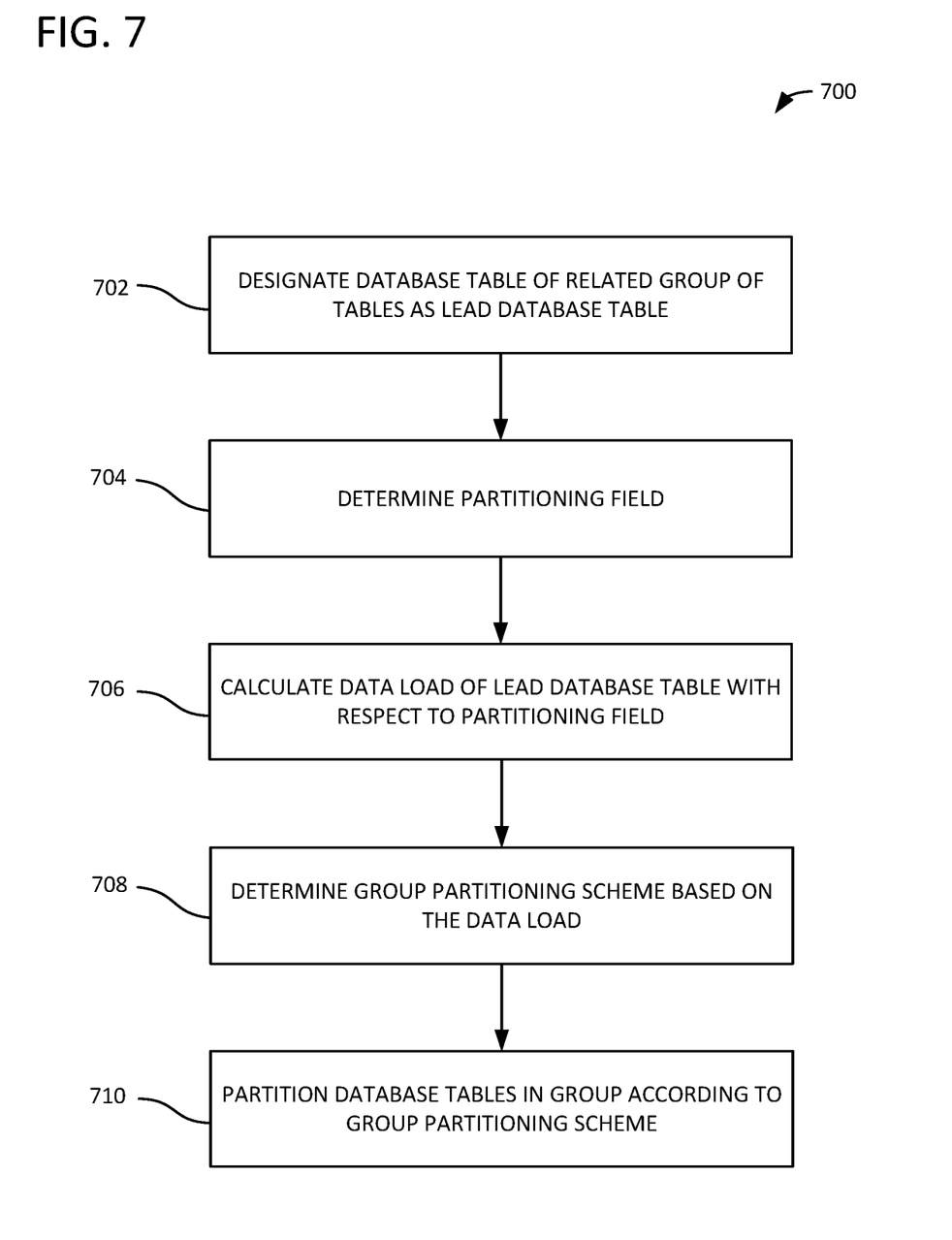
FIG. 7 illustrates an example method of partitioning a group of related database tables.

FIG. 7 illustrates a method 700. In process block 702, a database table in a group of related database tables is designated as a lead database table. In process block 704, a partitioning field is determined by which to partition database tables in the group that contain the partitioning field. In process block 706, a data load of the lead database table is calculated with respect to the partitioning field. In some examples, the data load of multiple (or all) database tables that contain the partitioning field is calculated. In process block 708, a group partitioning scheme is determined based at least in part on the data load of the lead database table. In process block 710, the respective database tables of the group are partitioned according to the group partitioning scheme. The group partitioning scheme can also specify one or more partitioning field values by which to partition the database tables in the group that contain the partitioning field.

Figure 8:
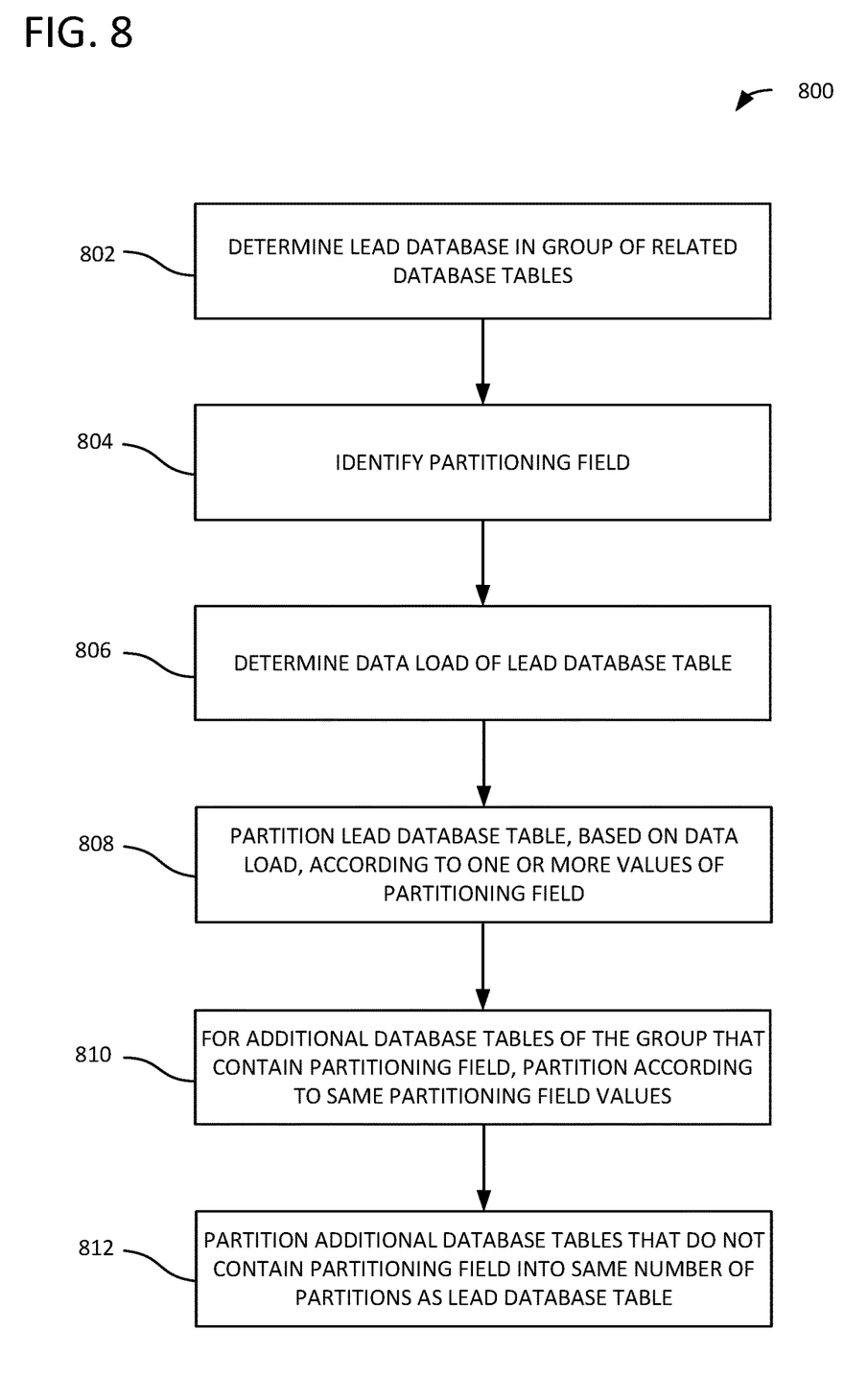
FIG. 8 illustrates an example method of partitioning a group of related database tables.

FIG. 8 illustrates a method 800. In process block 802, a lead database table in a group of related database tables is determined. In some examples, the lead database table is user selected. The lead database table can also be determined as the database table of the group having the most data or as a predetermined table based on the type of document containing the group of related databases. In process block 804, a field present in the lead database is identified as a partitioning field. A data load of the lead database table is determined in process block 806. The data load comprises amounts of data corresponding to different values of the partitioning field. In process block 808, based at least in part on the data load, the lead database table is partitioned according to one or more values of the partitioning field. In process block 810, for respective additional database tables of the group that contain the partitioning field, the respective database tables are partitioned according to the same one or more values of the partitioning field according to which the lead database table was partitioned. In process block 812, respective additional database tables of the group that do not contain the partitioning field are partitioned into a same number of partitions as the lead database table.

Examples of Computing Environments

Figure 9:
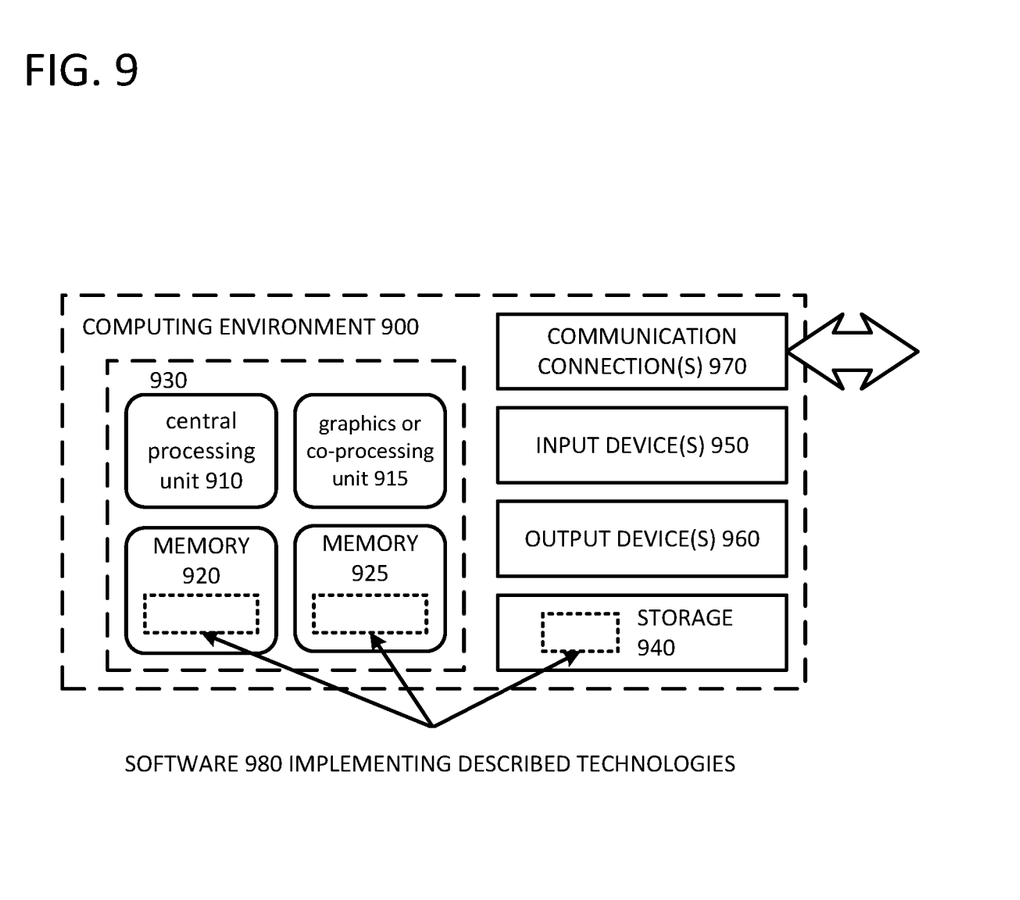
FIG. 9 is a diagram illustrating a generalized implementation environment in which some described examples can be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, media player, gaming system, mobile device, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power.

For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s). For example, memory 920 and 925 and software 980 can store computer-executable instructions for animating a transition from an initial data visualization to an alternative, circular data visualization. Computing environment 900 can include database table analyzer 104 and/or database table partitioner 112 of FIG. 1 or database table analyzer 204, database table partitioner 206, and/or database table merger 210 of FIG. 2.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. For video encoding, the input device(s) 950 may be a camera, video card, TV tuner card, or similar device that accepts video input in analog or digital form, or a CD-ROM or CD-RW that reads video samples into the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. One or more computing devices comprising:
   one or more processors;
   a database table analyzer configured to, by the one or more processors:
      designate a lead database table in a group of related database tables;
      determine, as a partitioning field, a field present in the lead database table; and
      evaluate a data load, with respect to the partitioning field, of the lead database table, wherein the data load comprises a data distribution across different values of the partitioning field; and
   a database table partitioner configured to, by the one or more processors:
      based on the evaluation of the data distribution of the data load, a minimum partition size threshold and a maximum partition size threshold, determine a group partitioning scheme which specifies one or more partitioning field values or one or more value ranges; and partition the group of related database tables according to the group partitioning scheme, wherein a plurality of database tables of the group of related database tables having the partitioning field are partitioned based on the specified one or more partitioning field values or one or more value ranges, and partitions created by the group partitioning scheme have sizes that are greater than the minimum partition size threshold and smaller than the maximum partition size threshold.

2. The one or more computing devices of claim 1, wherein the group partitioning scheme specifies, for database tables not having the partitioning field, a partitioning ratio, which specifies a ratio between a number of partitions created for database tables not having the partitioning field and a number of partitions created for database tables having the partitioning field.

3. The one or more computing devices of claim 1, wherein the database table analyzer is further configured to evaluate the data load by evaluating the data load of the lead database table of the group of related database tables.

4. The one or more computing devices of claim 3, wherein the lead database table is the database table of the group having the highest number of data entries and in which the partitioning field is present.

5. The one or more computing devices of claim 1, wherein the database table analyzer is further configured to evaluate a data load of database tables other than the lead database table in the group in which the partitioning field is present.

6. The one or more computing devices of claim 1, further comprising, a database table merger configured to, by the one or more processors, merge one or more pre-existing partitions prior to the partitioning.

7. The one or more computing devices of claim 6, wherein the database table merger is further configured to, after the partitioning and upon determining that a partition of a database table of the group of related database tables has a growth rate below a threshold, merge the partition with another partition.

8. The one or more computing devices of claim 1, wherein the partitioning field is one of a date, item number, or numeric code.

9. The one or more computing devices of claim 1, wherein the database table partitioner is further configured to, after the partitioning and upon determining that a partition of a database table of the group of related database tables is approaching a partition size threshold, repartition the partition into two or more additional partitions.

10. One or more non-transitory computer-readable storage media storing computer-executable instructions for:
designating a database table in a group of related database tables as a lead database table;
determining a partitioning field in the lead database table;
calculating a data load of the lead database table with respect to the partitioning field, wherein the data load comprises a data distribution across different values of the partitioning field;
determining a group partitioning scheme based at least in part on the data distribution of the data load of the lead database table, a minimum partition size threshold and a maximum partition size threshold, wherein the group partitioning scheme specifies one or more partitioning field values or one or more value ranges by which to partition database tables having the partitioning field; and partitioning the lead database table and at least one other database table of the group having the partitioning field according to the group partitioning scheme such that both the lead database table and the at least one other database table are partitioned according to the specified one or more partitioning field values or one or more value ranges, and each partition created by the group partitioning scheme has a size that is greater than the minimum partition size threshold and smaller than the maximum partition size threshold.

11. The one or more computer-readable storage media of claim 10, wherein the group partitioning scheme specifies that database tables not containing the partitioning field are partitioned into a same number of partitions as the lead database table.

12. The one or more computer-readable storage media of claim 11, wherein the group partitioning scheme further specifies that the partitions into which the database tables not containing the partitioning field are partitioned are equally sized.

13. The one or more computer-readable storage media of claim 11, wherein the group partitioning scheme further specifies one or more partitioning field values by which to partition the database tables in the group that contain the partitioning field.

14. The one or more computer-readable storage media of claim 11, wherein the group partitioning scheme further specifies that the partitions into which the database tables not containing the partitioning field are partitioned are sized proportionally to partitions of the lead database table.

15. The one or more computer-readable storage media of claim 11, further comprising instructions for, after determining the group partitioning scheme, providing a graphical representation of proposed partitions for the database tables in the group.

16. A method comprising:
determining a lead database table in a group of related database tables, wherein the lead database table is user-selected or predetermined or based on data access frequency;
identifying, as a partitioning field, a field present in the lead database table;
determining a data load of the lead database table, the data load comprising amounts of data corresponding to different values of the partitioning field;
based at least in part on the data load, a minimum partition size threshold and a maximum partition size threshold, partitioning the lead database table according to one or more values of the partitioning field, wherein each partition has a size that is greater than the minimum partition size threshold and smaller than the maximum partition size threshold;
partitioning additional database tables of the group that contain the partitioning field according to the same one or more values of the partitioning field according to which the lead database table was partitioned; and
partitioning additional database tables of the group that do not contain the partitioning field into a same number of partitions as the lead database table.

17. The method of claim 16, further comprising after the partitioning of (i) the database tables that contain the partitioning field and (ii) the database tables that do not contain the partitioning field, and upon determining that a partition of a database table of the group of related database tables has a growth rate below a threshold, merge the partition with another partition.

18. The method of claim 16, further comprising:
providing a graphical representation of proposed partitions for the database tables in the group;
providing a user interface that allows a user to interactively change boundaries of the proposed partitions; and
prior to partitioning the lead database table, receiving an indication of approval of the proposed partitions.

19. The one or more computer-readable storage media of claim 10, wherein:
the group partitioning scheme is configured to subdivide a proposed partition if it exceeds the maximum partition size threshold or combine two or more proposed partitions if they are below the minimum partition size threshold.

* * * * *